United States Patent
Jiang

(10) Patent No.: US 11,272,658 B2
(45) Date of Patent: Mar. 15, 2022

(54) CONTROL PANEL, SELF-PROPELLED SWITCH APPARATUS, AND POWER DEVICE

(71) Applicant: Globe (Jiangsu) Co., Ltd., Changzhou (CN)

(72) Inventor: Feng Jiang, Changzhou (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 342 days.

(21) Appl. No.: 16/309,664

(22) PCT Filed: Jun. 14, 2017

(86) PCT No.: PCT/CN2017/088216
§ 371 (c)(1),
(2) Date: Dec. 13, 2018

(87) PCT Pub. No.: WO2017/215604
PCT Pub. Date: Dec. 21, 2017

(65) Prior Publication Data
US 2019/0307066 A1    Oct. 10, 2019

(30) Foreign Application Priority Data

Jun. 14, 2016  (CN) .......................... 201610412240.1
Jun. 14, 2016  (CN) .......................... 201610412321.1
(Continued)

(51) Int. Cl.
*A01D 34/82*  (2006.01)
*A01D 34/00*  (2006.01)
(Continued)

(52) U.S. Cl.
CPC ......... *A01D 34/824* (2013.01); *A01D 34/006* (2013.01); *A01D 34/37* (2013.01);
(Continued)

(58) Field of Classification Search
CPC ............... A01D 34/824; A01D 34/006; A01D 34/6818; A01D 34/828; A01D 3024/6843;
(Continued)

(56) References Cited

U.S. PATENT DOCUMENTS 3,218,876 A * 11/1965 Berger ................... A01D 34/63
                                                      476/9
5,203,147 A *  4/1993 Long .................. A01D 34/6818
                                                     56/10.1
(Continued)

FOREIGN PATENT DOCUMENTS

CN    104686049 A    6/2015
CN    204616397 U    9/2015
(Continued)

OTHER PUBLICATIONS

Chinese Patent Office; Search Report in related International Patent Application No. PCT/CN2017/088216 dated Sep. 19, 2017; 6 pages.

*Primary Examiner* — Adam J Behrens
*Assistant Examiner* — Madeline Ivy Runco
(74) *Attorney, Agent, or Firm* — Rooney IP, LLC

(57) ABSTRACT

A control panel, a self-propelled switch apparatus, and a power device (13). The control panel comprises a pushing rod (1) connected to a machine body and a panel assembly (2) reciprocatingly sliding on the pushing rod. The control panel further comprises locking assembly (41, 42) connected to the panel assembly. The locking assembly (41, 42) are adapted to lock the panel assembly on the pushing rod and unlock the control panel and the pushing rod. The control panel further comprises a self-propelled switch (134), and when the self-propelled switch (134) is triggered, a device in which the control panel is disposed can be switched from a manual-power driving mode to a self-
(Continued)

propelled driving mode. By means of the solution, a garden tool can walk in a self-propelled manner, and can also be pushed to walk.

8 Claims, 16 Drawing Sheets

(30) Foreign Application Priority Data

Jun. 14, 2016 (CN) .......................... 201610413596.7
Jun. 14, 2016 (CN) .......................... 201610419586.4

(51) Int. Cl.
| | | |
|---|---|---|
| *A01D 34/68* | (2006.01) | |
| *G05G 5/00* | (2006.01) | |
| *H01H 27/06* | (2006.01) | |
| *A01D 75/18* | (2006.01) | |
| *A01D 34/37* | (2006.01) | |

(52) U.S. Cl.
CPC ....... *A01D 34/6818* (2013.01); *A01D 34/828* (2013.01); *A01D 75/18* (2013.01); *G05G 5/005* (2013.01); *H01H 27/06* (2013.01); *A01D 2034/6843* (2013.01)

(58) Field of Classification Search
CPC .............. A01D 34/76; A01D 75/18; A01D 2034/6843; G05G 5/005; H01H 27/06; F16H 19/04; B60W 10/04; B60W 10/08; B60W 2300/15; B60W 2300/156; B60W 2710/08; B60W 2710/081; A01B 33/028
See application file for complete search history.

(56) References Cited

U.S. PATENT DOCUMENTS

| | | | | |
|---|---|---|---|---|
| 5,442,901 A | * | 8/1995 | Niemela | A01D 34/6806 |
| | | | | 180/65.6 |
| 6,082,083 A | * | 7/2000 | Stalpes | A01D 34/6806 |
| | | | | 56/10.8 |
| 6,470,981 B1 | * | 10/2002 | Sueshige | B62B 1/18 |
| | | | | 180/19.3 |
| 6,644,002 B2 | * | 11/2003 | Trefz | A01D 34/6806 |
| | | | | 56/10.8 |
| 7,165,383 B1 | | 1/2007 | Luton, Jr. | |
| 7,293,397 B2 | * | 11/2007 | Osborne | A01D 34/824 |
| | | | | 56/10.8 |
| 7,496,990 B2 | * | 3/2009 | Qiao | A01D 34/824 |
| | | | | 16/437 |
| 7,523,600 B2 | | 4/2009 | Sasaoka | |
| 7,540,102 B2 | * | 6/2009 | Olmr | E01H 5/04 |
| | | | | 37/245 |
| 7,540,131 B2 | * | 6/2009 | Stover | A01D 34/824 |
| | | | | 180/19.3 |
| 7,698,881 B2 | * | 4/2010 | McCane | A01D 34/824 |
| | | | | 56/10.8 |
| 7,712,292 B2 | * | 5/2010 | Stover | A01D 34/824 |
| | | | | 56/10.8 |
| 7,762,049 B2 | * | 7/2010 | Eaton | H01H 3/20 |
| | | | | 56/10.8 |
| 8,839,692 B2 | * | 9/2014 | Yanai | A01B 33/028 |
| | | | | 74/551.4 |
| 9,060,463 B2 | * | 6/2015 | Yamaoka | A01D 34/6806 |
| 2010/0025124 A1 | * | 2/2010 | Arpino | B62D 51/04 |
| | | | | 180/19.3 |
| 2011/0038107 A1 | * | 2/2011 | Hsiu | G06F 1/1671 |
| | | | | 361/679.01 |
| 2013/0046448 A1 | * | 2/2013 | Fan | A01D 34/824 |
| | | | | 701/50 |
| 2013/0312566 A1 | * | 11/2013 | Shaffer | A01D 42/08 |
| | | | | 74/490.14 |
| 2014/0102068 A1 | * | 4/2014 | Zhang | A01D 34/824 |
| | | | | 56/16.7 |
| 2014/0208709 A1 | | 7/2014 | Helin et al. | |
| 2014/0209050 A1 | * | 7/2014 | Wadzinski | H01H 9/06 |
| | | | | 123/179.1 |
| 2014/0345416 A1 | * | 11/2014 | Kaskawitz | G05G 13/00 |
| | | | | 74/523 |
| 2015/0330483 A1 | * | 11/2015 | Yamagata | E05B 81/06 |
| | | | | 74/89.17 |
| 2016/0047463 A1 | | 2/2016 | Helin et al. | |
| 2016/0101693 A1 | | 4/2016 | Bejcek | |
| 2016/0113194 A1 | * | 4/2016 | Prinzo | A01D 34/828 |
| | | | | 56/11.8 |

FOREIGN PATENT DOCUMENTS

| | | | | |
|---|---|---|---|---|
| CN | 105325128 A | 2/2016 | | |
| CN | 105432238 A | 3/2016 | | |
| CN | 106034568 A | 10/2016 | | |
| CN | 106057553 A | 10/2016 | | |
| CN | 106063409 A | 11/2016 | | |
| CN | 106105541 A | 11/2016 | | |
| EP | 0047416 A1 | * | 3/1982 | .......... A01D 34/828 |
| JP | 2013099324 A | 5/2013 | | |

\* cited by examiner

CONTROL PANEL, SELF-PROPELLED SWITCH APPARATUS, AND POWER DEVICE

CROSS-REFERENCE TO RELATED APPLICATIONS

This application is a US national application of International Application No. PCT/CN2017/088216 filed on Jun. 14, 2017, which claims the benefit of priorities to Chinese Patent Application No. 201610419586.4 titled "SELF-PROPELLED SWITCH APPARATUS AND LAWN MOWER", filed with the China State Intellectual Property Office on Jun. 14, 2016; Chinese Patent Application No. 201610413596.7 titled "POWER EQUIPMENT AND CONTROLLING METHOD THEREOF", filed with the China State Intellectual Property Office on Jun. 14, 2016; Chinese Patent Application No. 201610412240.1 titled "CONTROL PANEL AND GARDEN TOOLS INCLUDING THE SAME", filed with the China State Intellectual Property Office on Jun. 14, 2016; and Chinese Patent Application No. 201610412321.1 titled "CONTROL PANEL AND LAWN MOWER INCLUDING THE SAME", filed with the China State Intellectual Property Office on Jun. 14, 2016, the disclosures of which are hereby incorporated by reference in their entirety.

TECHNICAL FIELD

The present invention relates to a mechanical equipment, and more particularly to a control panel, a self-propelled switch apparatus, and a power device.

BACKGROUND

Existing garden tools work in self-propelled walking mode, or in a manually pushed walking mode, which cannot meet people's usage requirements.

SUMMARY OF INVENTION

An object of the present application is to provide a garden tool which can walk both in a self-propelled mode and in a manually pushed mode.

In order to resolve the above technical problem, the embodiment of the present invention provides a control panel, comprising:
 a pushing rod connected to a machine body;
 a panel assembly reciprocatingly sliding on the pushing rod;
 the locking assembly connected to the panel assembly, the locking assembly being adapted to lock the panel assembly on the pushing rod and unlock the panel assembly from the pushing rod; and
 a self-propelled switch, wherein the self-propelled switch is triggered;
 a device, in which the control panel is disposed, can be switched between a manual-power driving mode and a self-propelled driving mode.

As a preferred embodiment of the present invention, the locking assembly comprises a locking knob connected to the panel assembly, and at least one locking shaft connected to the locking knob and latched with the pushing rod, wherein when the locking shaft enters into the pushing rod, the panel assembly is locked on the pushing rod, and when the locking shaft exits from the pushing rod, the panel assembly can automatically slide along the pushing rod.

As a preferred embodiment of the present invention, the panel assembly comprises a first switch unit connected with the locking knob, wherein the first switch unit is adapted to control the locking shaft to lock or unlock the panel assembly through the locking knob.

As a preferred embodiment of the present invention, the first switch unit comprises a self-propelled key connected with the locking knob, the locking knob is driven to rotate by rotating the self-propelled key.

As a preferred embodiment of the present invention, the first switch unit further comprises a positioning assembly connected with the self-propelled key, wherein the positioning assembly is adapted to fix the self-propelled key.

As a preferred embodiment of the present invention, the first switch unit further comprises a self-propelled key knob assembled on the self-propelled key, wherein the self-propelled key is driven to move upwardly and downwardly by the self-propelled key knob.

As a preferred embodiment of the present invention, when the locking knob rotates to bring the locking shaft to unlock the panel assembly, the locking knob touches and triggers the self-propelled switch.

As a preferred embodiment of the present invention, the control panel, comprises a starting switch arranged on the panel assembly, the panel assembly comprises a first starting unit disposed on the panel assembly, the first starting unit comprises a starting key disposed on the panel assembly and being moveable upwardly and downwardly; wherein when the starting key moves to a bottom of the panel assembly, a bottom of the starting key will touch and start the starting switch under a push of a bottom of the pulling rod, and the starting switch will be closed when the bottom of the starting key disconnected from the starting switch.

As a preferred embodiment of the present invention, the pulling rod comprises a compression block adapted to push the starting key to touch the starting switch as the pulling rod rotates, wherein a distance between the starting switch and the compression block is larger than a translation distance of the compression block caused by the rotation thereof.

As a preferred embodiment of the present invention, the control panel comprises a motor rotation switch and a second starting unit electrically connected and comprising a button unit, a connecting assembly, and an operating assembly; wherein the button unit moves downwardly to press the connecting assembly connecting with the operating assembly, and the connecting assembly is driven to move and press the motor rotation switch by moving the operating assembly, in such a manner that the motor rotation switch is triggered.

As a preferred embodiment of the present invention, the operating assembly comprises a pulling rod movably connected to the panel assembly and a pulling plate driven by the pulling rod; the button unit comprises a pressing head suitable for receiving a pressing operation; the connecting assembly comprises a sliding plate movably connected with the panel assembly and a hanging plate movably connected with the sliding plate, wherein the pressing head is arranged on the upper part of the hanging plate, one end of the hanging plate is located on the upper part of the pulling plate, the pressing head is pressed down to engage the hanging plate and the pulling plate, and the hanging plate is driven to move by moving the pulling plate driven by the pulling rod, and the sliding plate is driven to move along the panel assembly to trigger the motor rotation switch through the hanging plate.

As a preferred embodiment of the present invention, a pressing head button is arranged and connected at the upper end of the pressing head, and the pressing head is driven to move downward by pressing the pressing head button.

An embodiment of the present invention further provides a power device, comprising:
a housing,
a first motor located in the housing and adapted to provide self-propelled power for the power device,
a second motor located in the housing and adapted to provide working power for the power device;
a control panel, the control panel having a pushing rod extending outward from the housing and providing a guideway, and a panel assembly sliding along the guideway, the control panel comprising a locking assembly connected to the panel assembly, the locking assembly being adapted to lock the panel assembly on the pushing rod and unlock the panel assembly with the pushing rod, the control panel further comprising a self-propelled switch electrically connected with the first motor for controlling the first motor; wherein when the self-propelled switch is triggered, the first motor begins to work and change the device from a manual-power driving mode to a self-propelled driving mode.

As a preferred embodiment of the present invention, the self-propelled switch is adapted to start or close the first motor, wherein when the power device is in the self-propelled driving mode, the locking assembly is also adapted to set the self-propelled speed of the power device at different values, in such a manner that the power device may be switched in the variable speed self-propelled mode and the constant speed self-propelled mode.

As a preferred embodiment of the present invention, several positioning holes are arranged at different positions of the pushing rod, and the locking assembly is adapted to lock the panel assembly at different position of the different positioning holes.

As a preferred embodiment of the present invention, the panel assembly comprises a sliding potentiometer connected to the first motor; the sliding potentiometer comprises a potentiometer base and a sliding needle movably connected to the potentiometer base; according to the moving distance of the sliding needle on the potentiometer base, the first motor adjusts the rotation speed to adjust the self-propelling speed of the power device.

As a preferred embodiment of the present invention, the acceleration of the sliding needle as moving within [0, s1] is less than the acceleration of the sliding needle as moving within [s1, s2], wherein S1 represents a relative displacement distance between the panel assembly and the guideway as the preset first distance, and S2 represents a relative displacement distance between the panel assembly and the guideway as the maximum distance.

As a preferred embodiment of the present invention, the power device further comprises a reset apparatus arranged between the two guideways on both sides of the pushing rod, the reset apparatus is adapted to reset the location of the panel assembly.

As a preferred embodiment of the present invention, the reset apparatus comprises a reset rod connected to the panel assembly and the pushing rod, and a reset rod return spring sleeved on the reset rod, one end of the reset rod return spring connected to the pushing rod, wherein the reset rod is driven to rotate around the pushing rod by the movement of the panel assembly, the reset rod is driven rotate back by the reset rod return spring, in such a manner that the panel assembly moves back to its original position.

Figure 1:
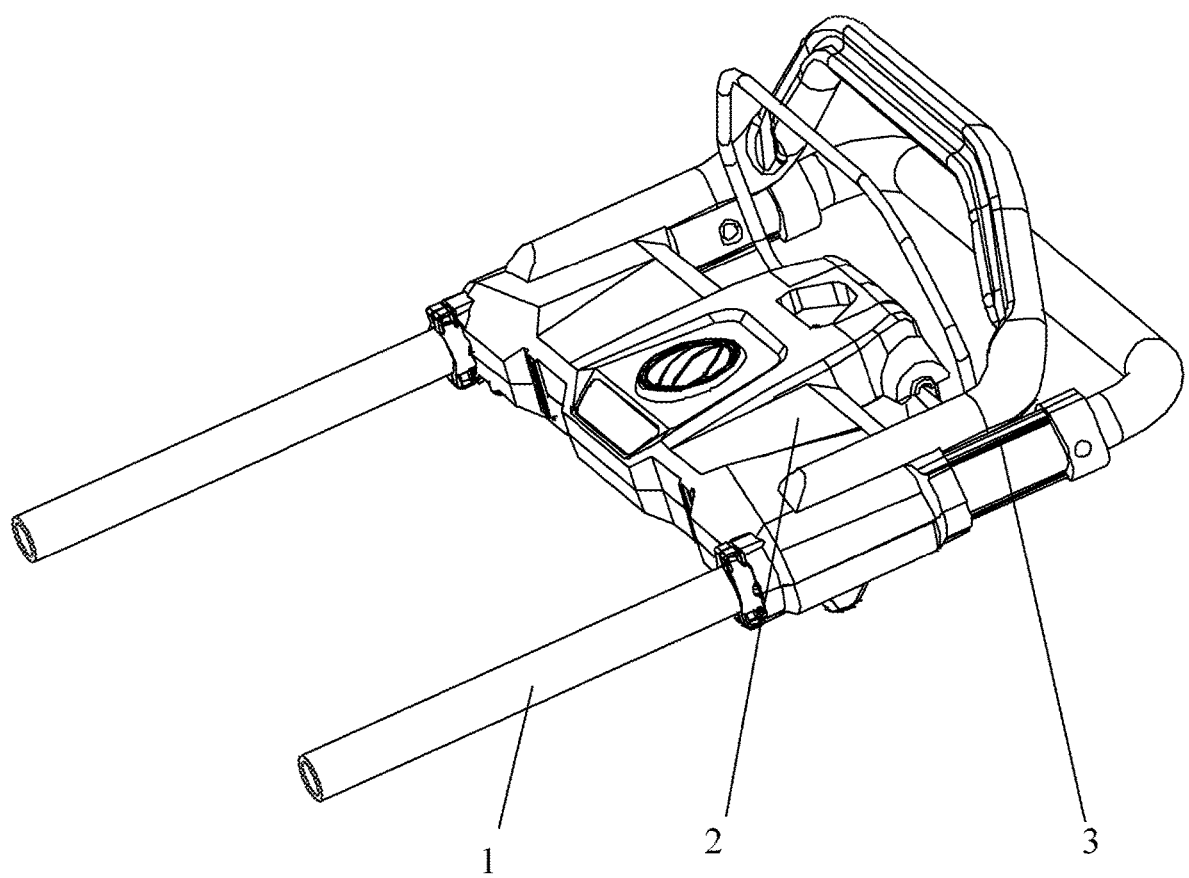
FIG. 1 is a perspective view of a control panel in accordance with an embodiment of the present invention

Reference numerals in the Figures: 1, pushing rod; 2, panel assembly; 21, upper panel; 22, lower panel; 3, guideway; 41, locking knob; 42, locking shaft; 51, self-propelled key; 52, catching slot; 53, positioning hole; 54, self-propelled key knob; 55, key reset spring; 71, starting switch; 72, starting key; 721, movable contacting block; 73, pulling rod; 731, compression block; 732, gear; 74, elastic connector; 81, motor rotation switch; 82, button unit; 821, pressing head; 821a, pressing head button; 822, button reset spring; 83, connecting assembly; 831, sliding plate; 832, hanging plate; 832a, convex structure; 833, hanging plate torsion spring; 84, operating assembly; 841, pulling plate; 841a, rack; 841b, latching groove; 842, pulling plate reset spring; 13, power device; 131, housing; 132, first motor; 133, second motor; 134, self-propelled switch; 9, sliding potentiometer; 91, potentiometer base; 92, sliding needle; 101, reset rod; 101a, main rod; 101b, auxiliary rod; 102, reset rod return spring; 103, chuck.

DESCRIPTION OF EMBODIMENTS

Currently, the garden tool can only be used in self-propelled walking mode, or can only walk by manually pushed or pulled, which cannot meet people's usage requirements.

Figure 3:
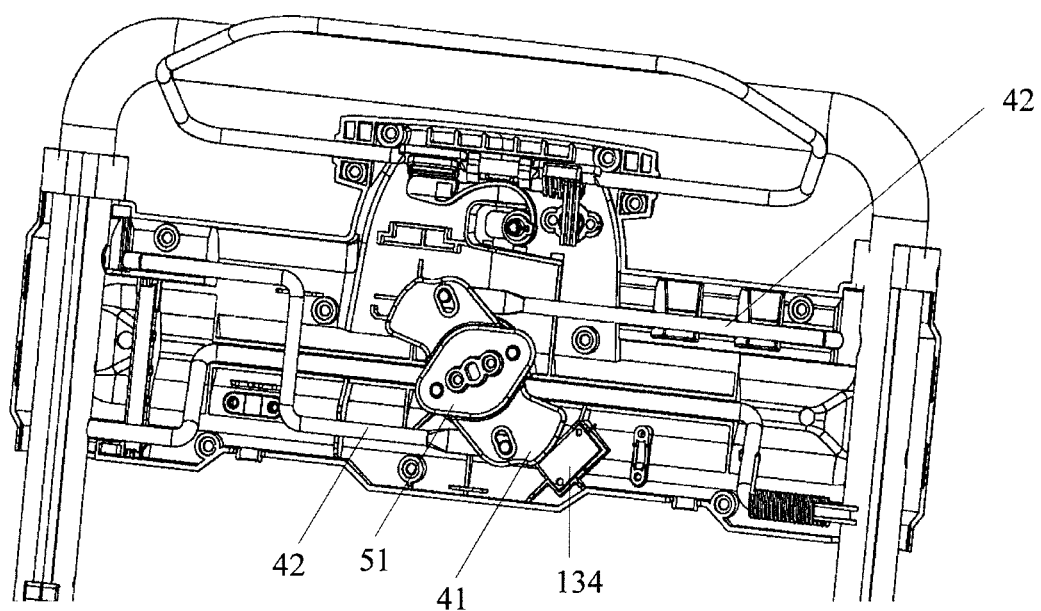
FIG. 3 is partial perspective view of the control panel in FIG. 1, wherein an upper panel of the control panel is removed.
Figure 4:
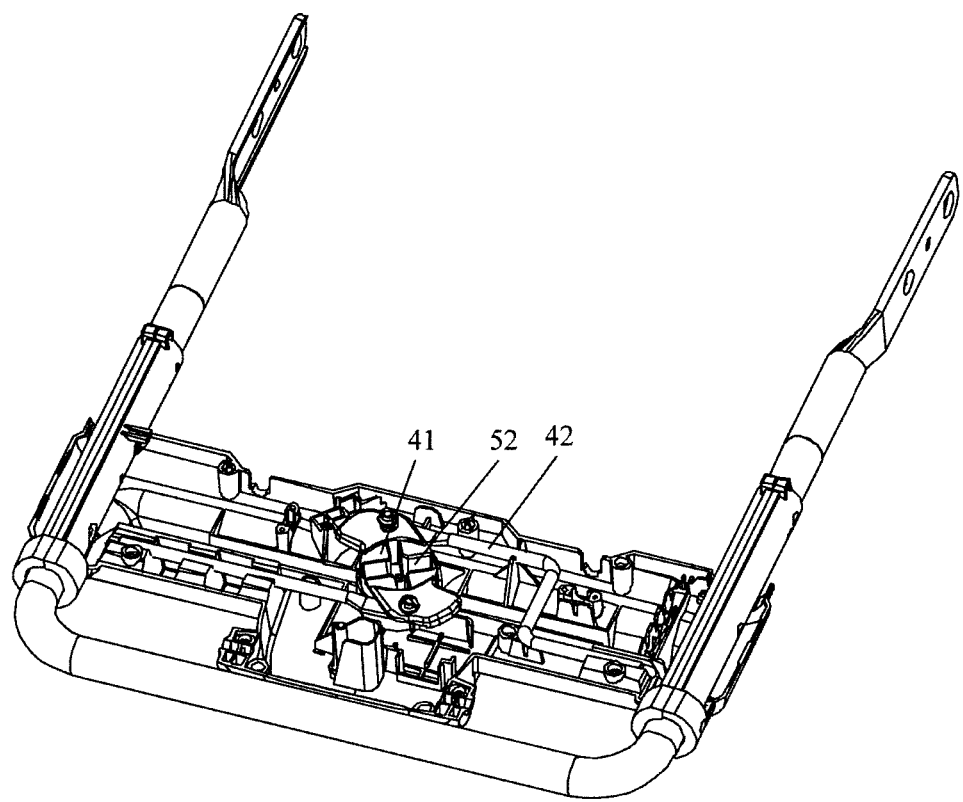
FIG. 4 is another partial perspective view of the control panel in FIG. 1, similar with FIG. 3.

In view of the above problems, an embodiment of the present invention discloses a control panel and a device in which the control panel is disposed. Conjoined with FIG. 14, the device comprises a housing 131, a first motor 132 and a second motor 133. The device has a self-propelled driving mode in which both the first motor 132 and the second motor 133 work, and a manual-power driving mode in which only the second motor 133 works. The control panel is used to start or shut the first motor so as to switch the device between self-propelled driving mode and the manual-power driving modes. The control panel has a self-propelled switch 134 (referring to FIG. 3), which is electrically connected with the first motor 132, and adapted to start or close the first motor 132, details will be provide in below.

Referring to FIGS. 1-5, the embodiment of the present invention discloses the control panel. The control panel comprises a pushing rod 1 connected to a machine body, a panel assembly 2 reciprocatingly sliding along the pushing rod 1 and a locking assembly connected to the panel assembly 2. The locking assembly can both lock the panel assembly 2 on the pushing rod 1 and unlock the panel assembly 2 from the pushing rod 1. And the locking assembly also can trigger the self-propelled switch 134 to make the first motor 132 work.

In this embodiment, the panel assembly 2 comprises an upper panel 21 and a lower panel 22 connected to the upper panel 21. The pushing rod 1 can be a U-shaped pushing rod.

In this preferred embodiment, the pushing rod 1 are usually provided with two guideways 3 at opposite sides thereof, so that the panel assembly 2 can reciprocatingly slide on the guideways 3.

In one embodiment of the present invention, the locking assembly comprises a locking knob 41 connected to the panel assembly 2, and at least one locking shaft 42 connected to the locking knob 41 and latching with the pushing rod 1.

When the locking shaft 42 enters into the pushing rod 1, the panel assembly 2 will be locked on the pushing rod 1. At this time, the self-propelled switch 134 is not triggered, the device in which the control panel is disposed, can only work in the manual-power driving mode. When the locking knob 41 rotates and bring the locking shaft 42 exiting from the pushing rod 1, and at the same time, the locking knob 41 triggers the self-propelled switch 134 that causes the first motor 132 begin to work, the panel assembly 2 can automatically slide along the pushing rod 1, that is, the panel assembly 2 is unlocked. At this time, the device in which the control panel is disposed, can work in self-propelled driving mode.

In one embodiment of the present invention, the locking shafts 42 can be arranged on two sides of the locking knob 41. A plurality of pushing rod holes can be arranged at the corresponding positions of the guideways 3. The locking shafts 42 can lock the panel assembly 2 in different positions of the pushing rod 1 by inserting into the corresponding pushing rod holes of the pushing rod 1.

In one embodiment of the present invention, the panel assembly 2 comprises a first switch unit connected with the locking knob 41. When the first switch unit controls the locking shaft 42 to lock the panel assembly 2 through the locking knob 41, the self-propelled switch 134 which controls the first motor for providing the self-propelled power for the device with the control panel is not triggered. When the first switch unit controls the locking shaft 42 to unlock the panel assembly 2 through the locking knob 41, the self-propelled switch 134 is touched and triggered by the locking knob 41, the first motor 132 begins to work and the device switches from the manual-power driving mode to the self-propelled driving mode.

The first switch unit is configured to prevent the panel assembly 2 from unlocking or locking by mistake. The accident caused by unlocking or locking the panel assembly 2 through directly operating the locking knob 41 can be avoided. The safety of the equipment is improved consequently.

In one embodiment of the present invention, the first switch unit comprises a self-propelled key 51 connected with the locking knob 41. The self-propelled key 51 is latched with the locking knob 41, so that the locking knob 41 is driven to rotate by rotating the self-propelled key 51, and the locking shaft 42 exits from the pushing rod 1 to unlock the panel assembly 2.

In one embodiment of the present invention, the self-propelled key 51 has a clip (not shown). The locking knob 41 has a catching slot 52 engaging with the clip. When the self-propelled key 51 moves downwardly and ratably, the clip engages in the catching slot 52. So that the locking knob 41 can be driven to rotate by continually rotating the self-propelled key 51.

In the embodiment, both of the cross sections of the clip and the catching slot 52 can be cross-shaped, or zigzag, or star-shaped. That is, no limitation on the cross-sectional shape is required.

In one embodiment of the present invention, the first switch unit can further comprise a positioning assembly connected with the self-propelled key 51 and being adapted to fix the self-propelled key 51.

Figure 5:
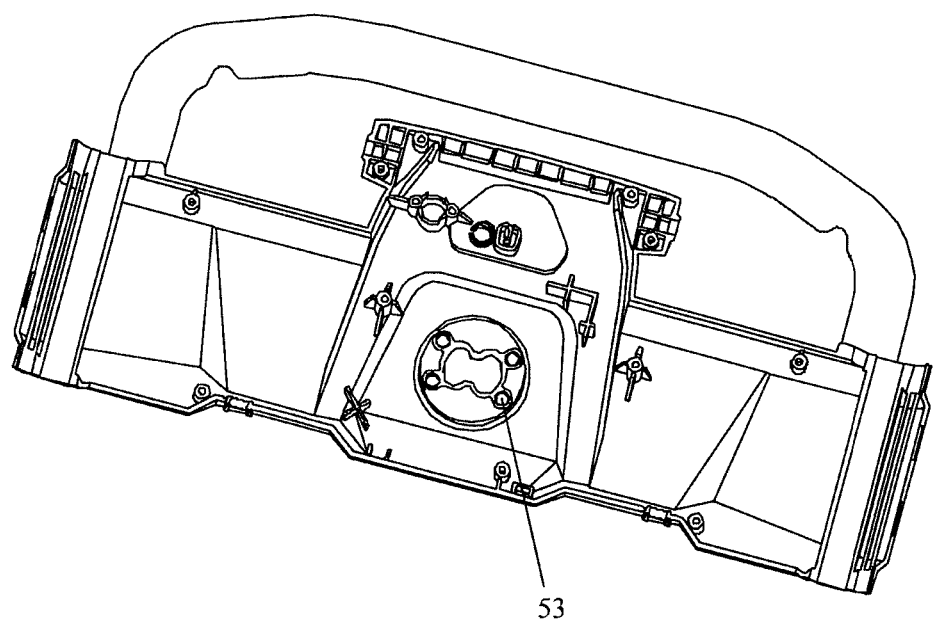
FIG. 5 is a perspective view of the upper panel of the control panel in accordance with the embodiments of the present invention.

Referring to FIG. 5, in the preferred embodiment, the positioning assembly comprises a plurality of positioning holes 53 defined on the panel assembly 2 and a plurality of positioning columns (not shown) arranged on the self-propelled key 51. The positioning columns are received within and latched with the positioning holes 53 to fix the self-propelled key 51.

In the preferred embodiment, the quantity of the positioning holes 53 and the positioning columns are not restricted. Such as, the quantity of the positioning columns can be four, and the quantity of the positioning columns can be two.

Figure 2:
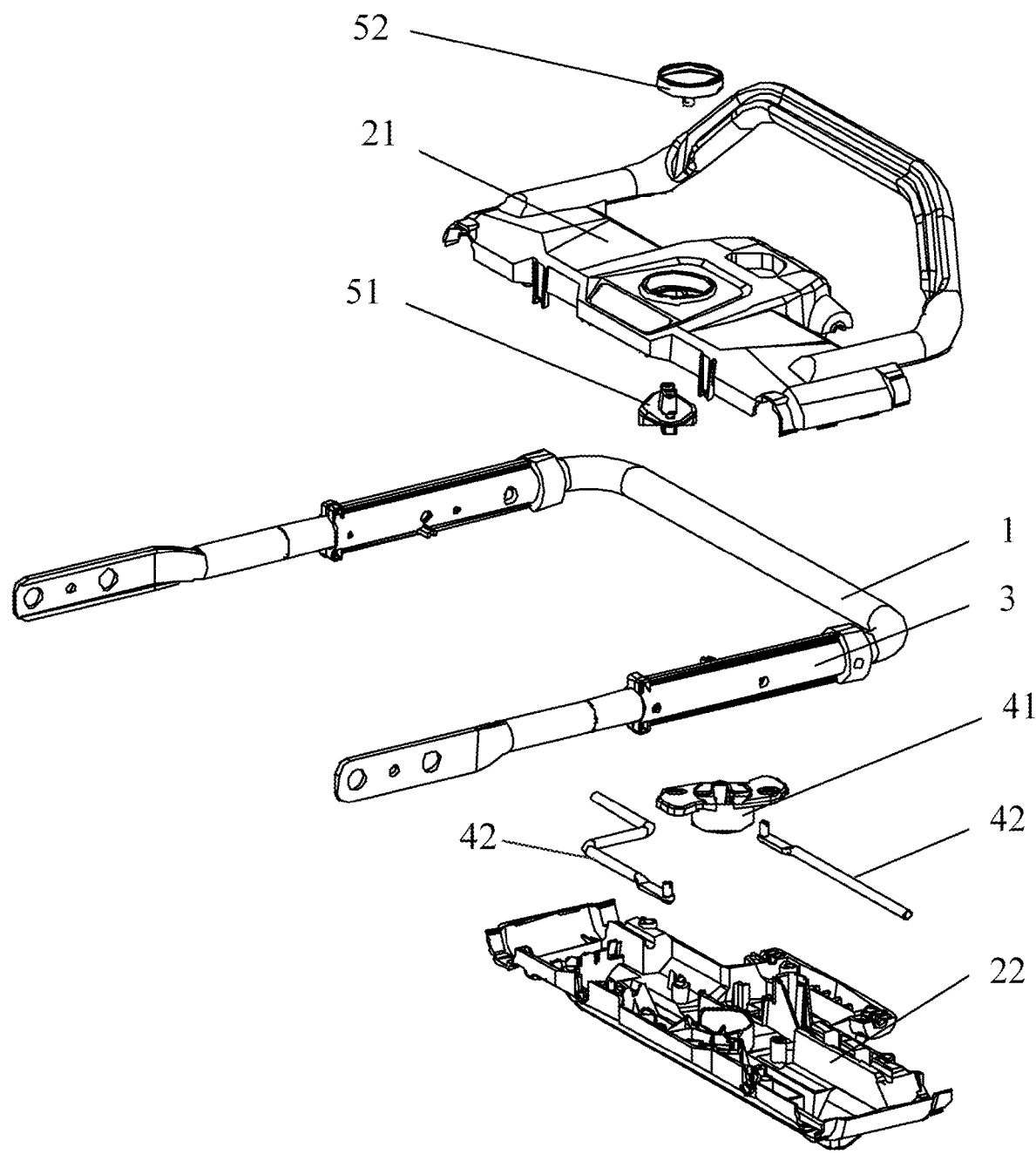
FIG. 2 is an exploded view of the control panel in FIG. 1.
Figure 6:
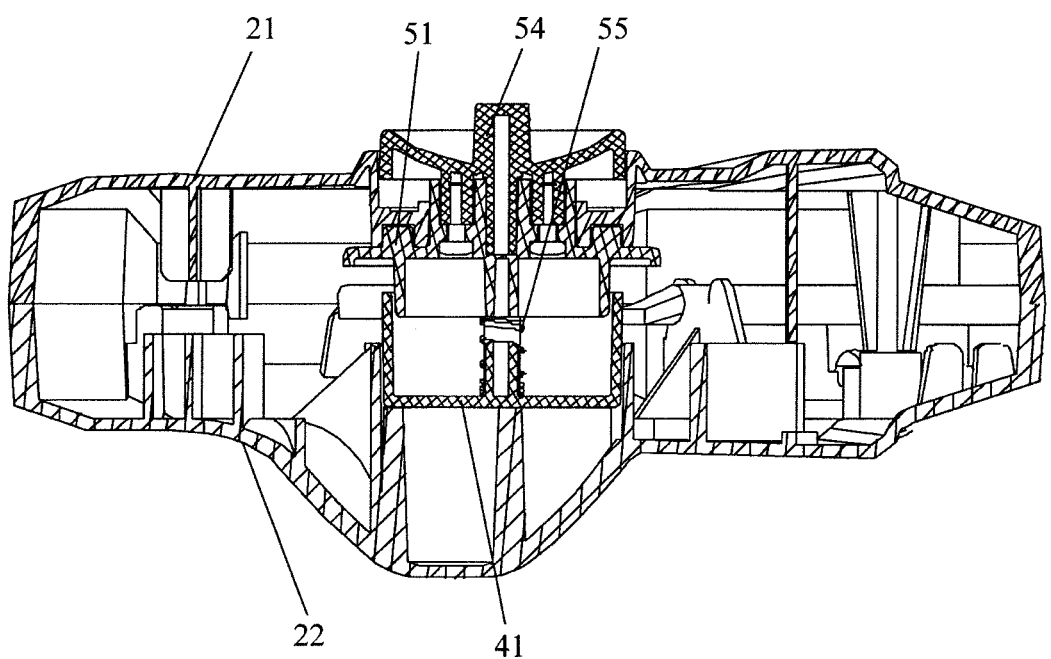
FIG. 6 is a perspective view of the internal structure of a first switch unit in accordance with the embodiments of the present invention.
Figure 7:
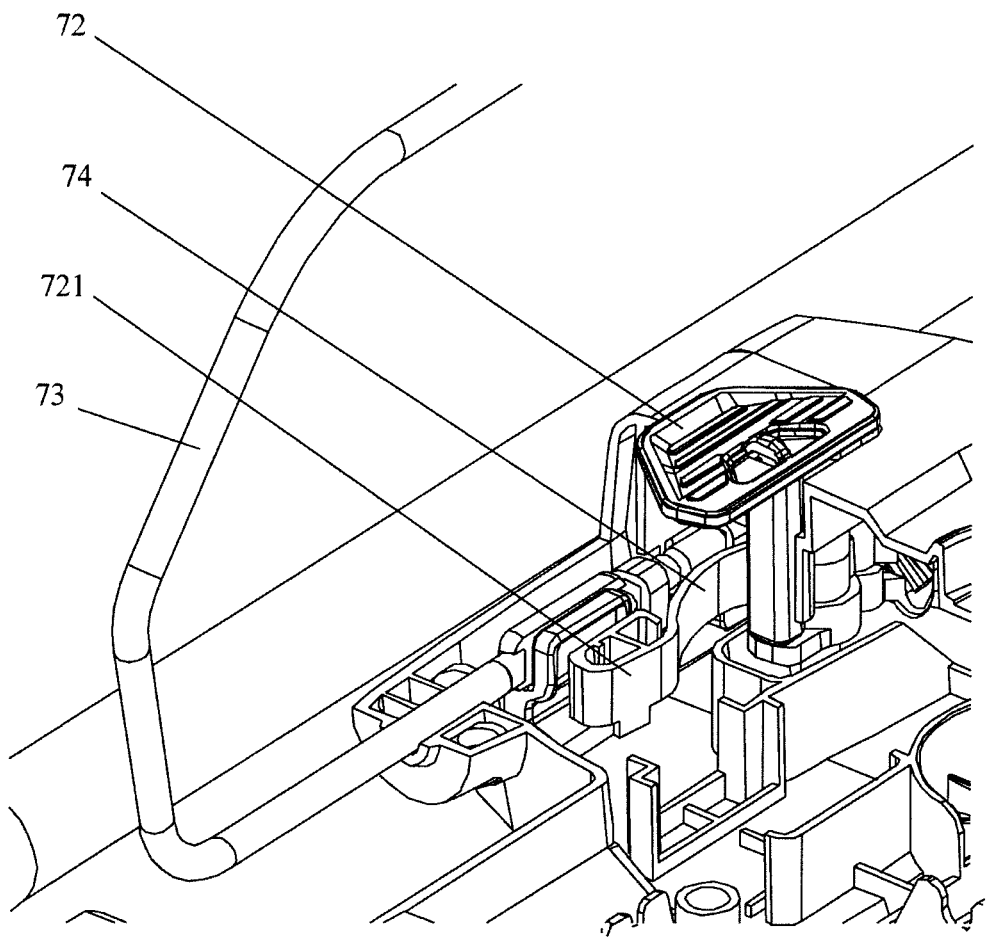
FIG. 7 is a perspective view of a first starting unit in accordance with the embodiments of the present invention.
Figure 8:
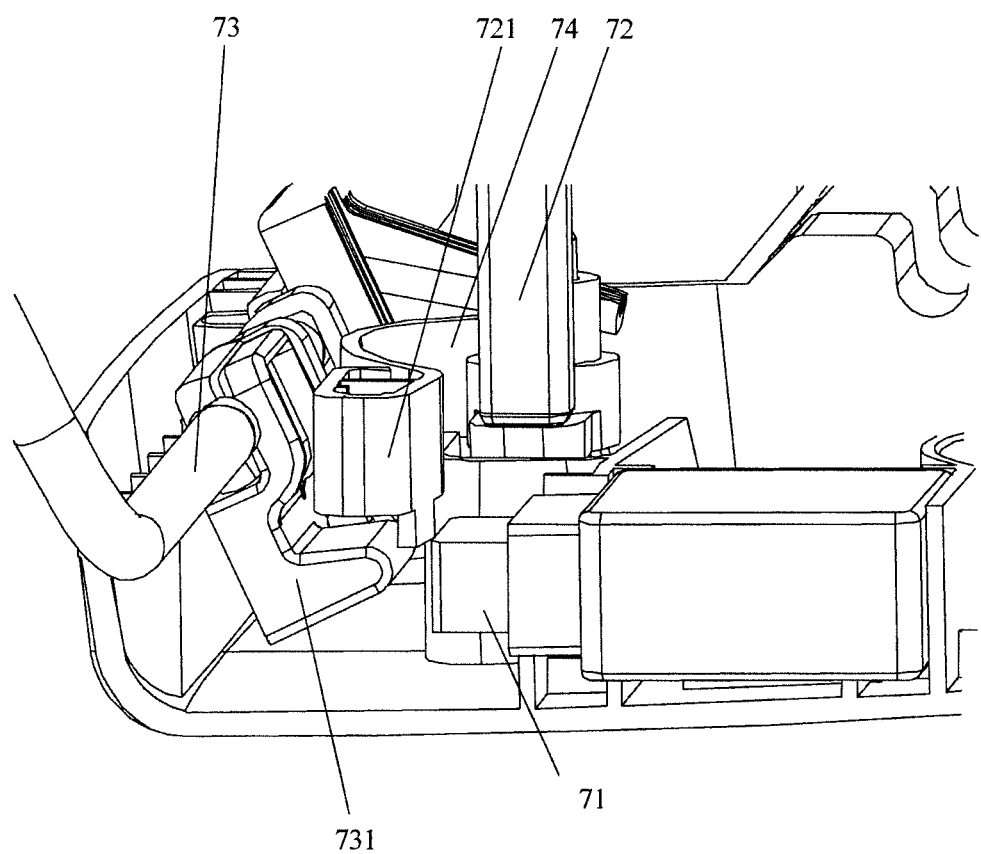
FIG. 8 is a perspective view of the first starting unit in closed state as shown in FIG. 7.
Figure 9:
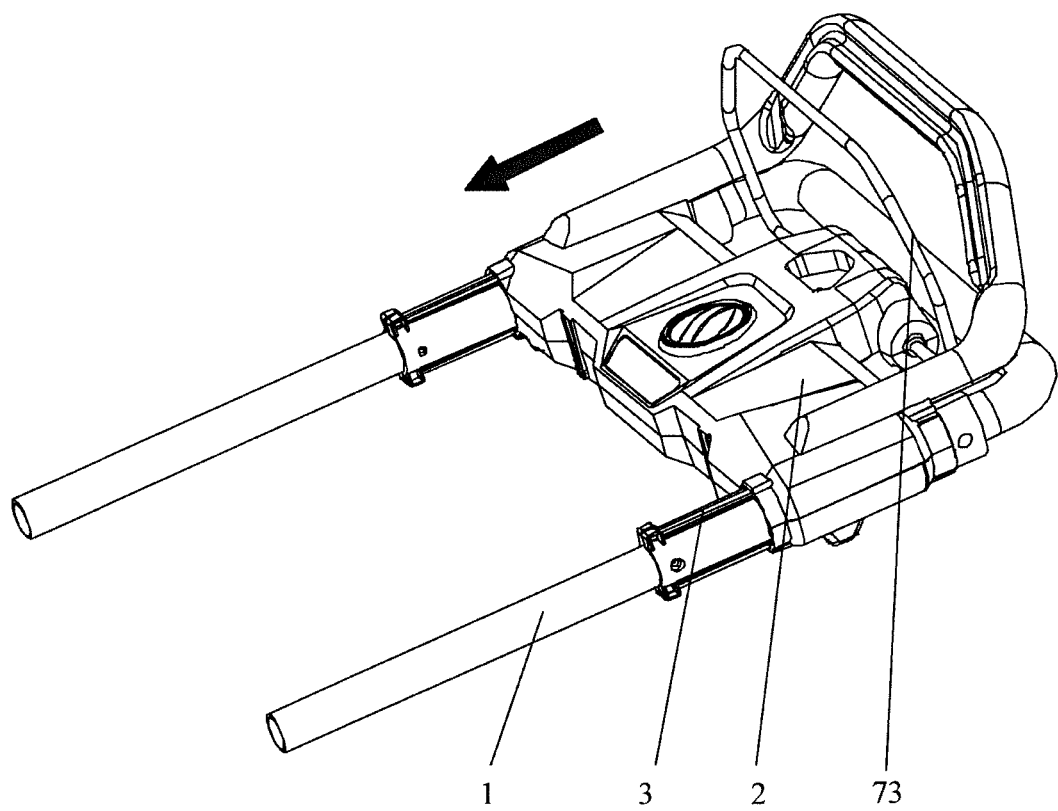
FIG. 9 is a perspective view of the location of a pulling rod as shown in FIG. 7.
Figure 10:
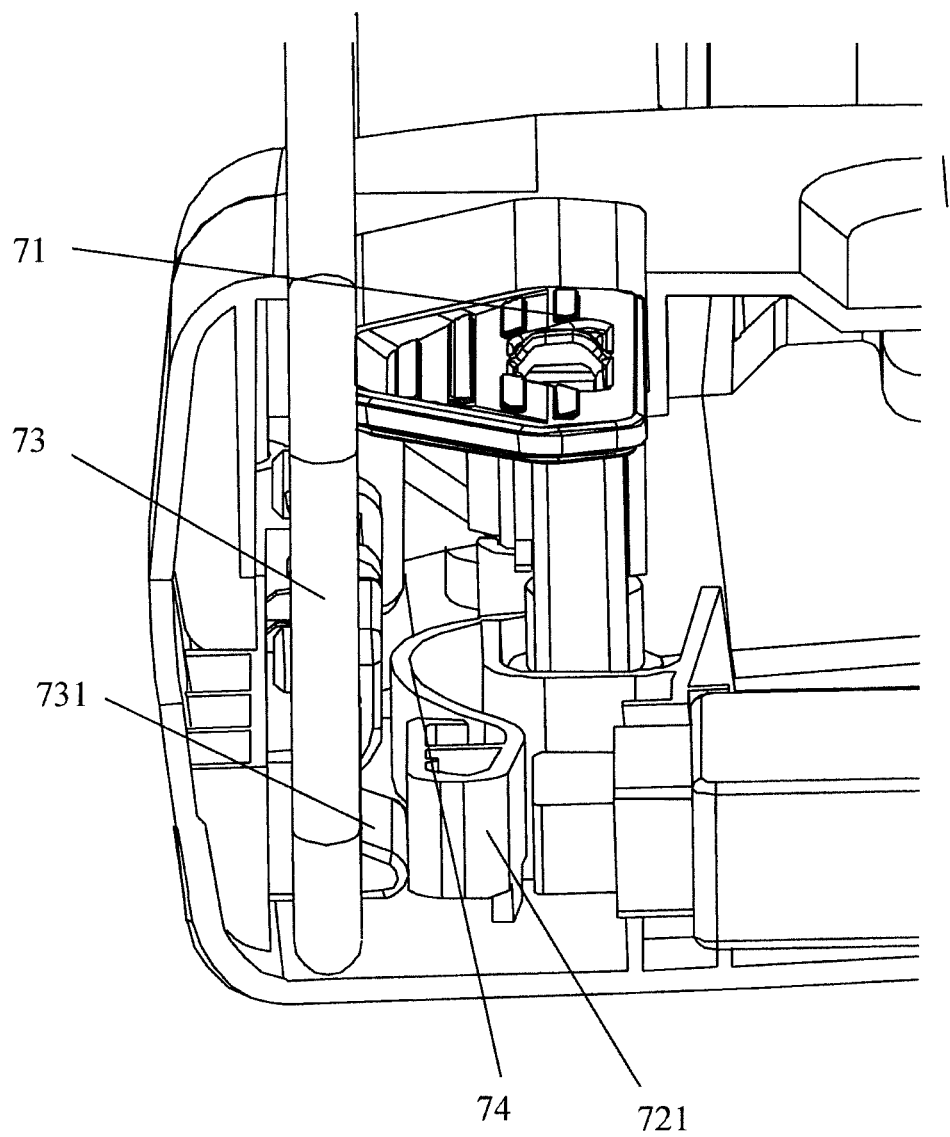
FIG. 10 is a perspective view of the first starting unit in open state as shown in FIG. 7.
Figure 11:
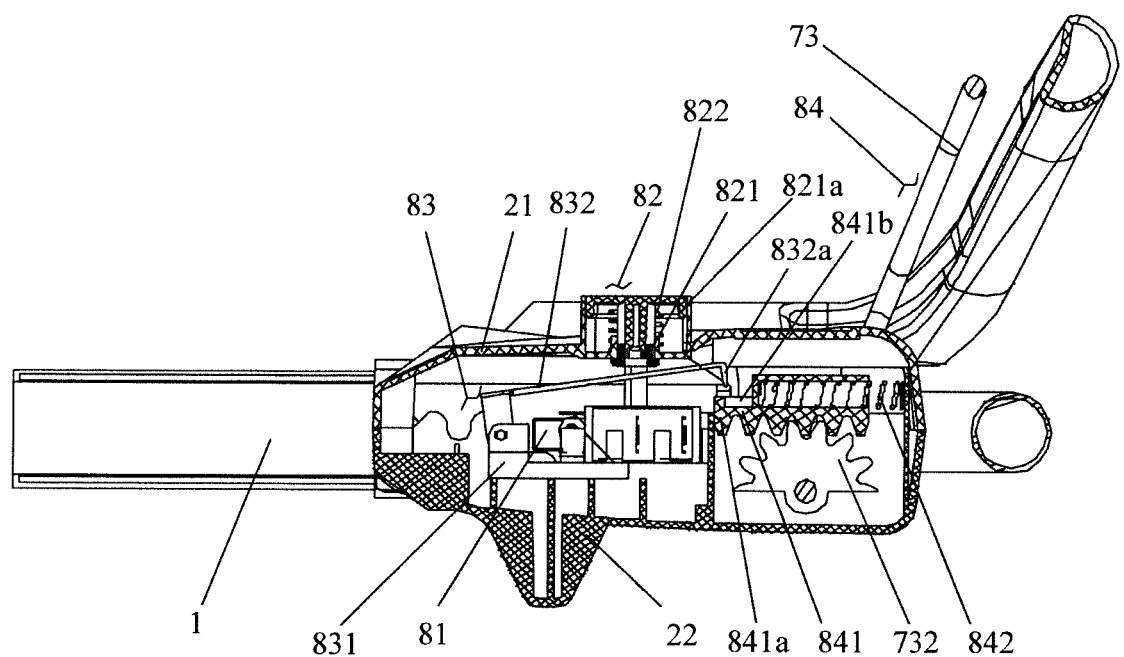
FIG. 11 is a cross-sectional view of a second starting unit in accordance with the embodiments of the present invention.
Figure 12:
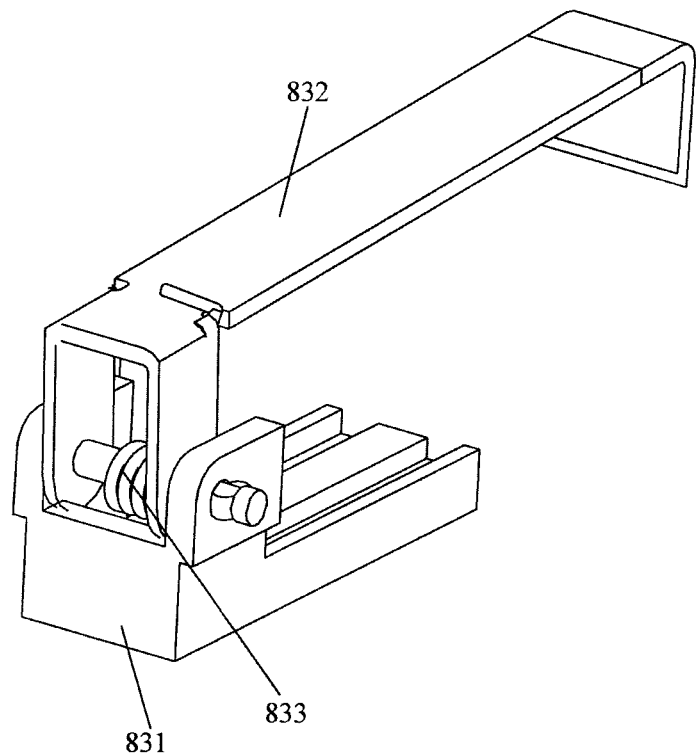
FIG. 12 is a perspective view of a connecting assembly as shown in FIG. 11.
Figure 13:
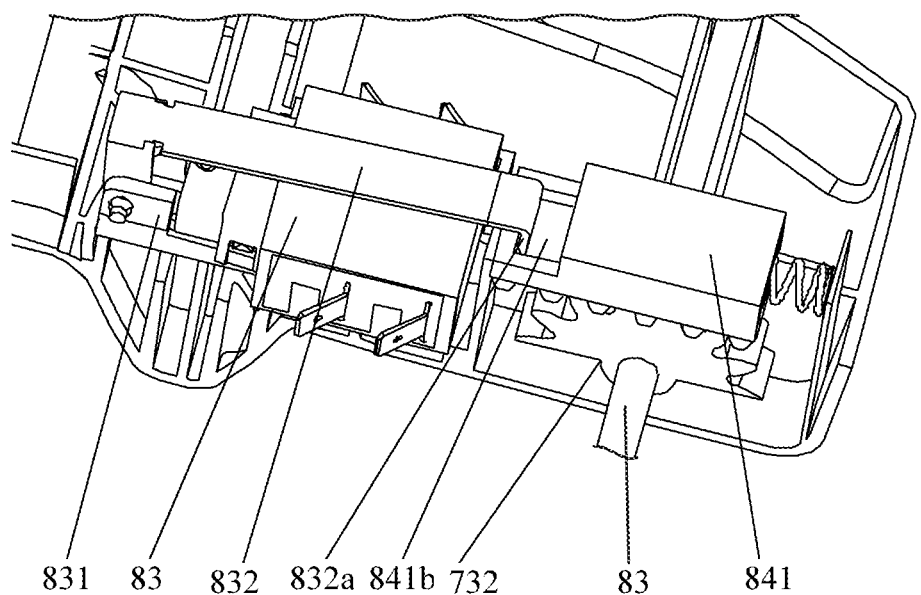
FIG. 13 is a perspective view of the second starting unit in open state as shown in FIG. 11.

Referring to FIG. 2 and FIG. 6, in one embodiment of the present invention, the first switch unit can further comprise a self-propelled key knob 54 which is assembled on the self-propelled key 51 and bring the self-propelled key 51 moving together.

Referring to FIG. 6, in one embodiment of the present invention, the first switch unit can further comprise a key reset spring 55 surrounding the self-propelled key knob 54 and being adapted to reset the location of the self-propelled key 51.

During applying the present invention, the self-propelled key 51 can be driven to move downwardly to separate from the positioning holes 53 by pressing downwardly the self-propelled key knob 54. The clip, disposed on the bottom of the self-propelled key 51, inserts into and latches with the catching slot 52 of the locking knob 41 by rotating the self-propelled key knob 54. Then, by continually rotating the self-propelled key knob 54, the self-propelled key 51 is driven to rotate and bring the locking knob 41 rotating, and then the left/right locking shafts 42, which connects with the locking knob 41 will compress and escape from the pushing rod 1. At this moment, the panel assembly 2 is unlocked and can freely slide on the pushing rod 1.

After releasing the self-propelled key knob 54, the self-propelled key 51 is ejected from the locking knob 41 under the action of the key reset spring 55. The positioning columns of the self-propelled key 51 is inserted into the corresponding positioning holes 53 of panel assembly 2, then the device enters in the manual-power driving mode.

During applying the present invention, the locking knob 41 can be arranged on the lower panel 22. The self-propelled key knob 54 and the self-propelled key 51 can be arranged on the upper panel 21.

Referring to FIG. 1 and FIGS. 7-10, the control panel comprises a starting switch 71 arranged on the panel assembly 2. The starting switch 71 electrically connects with the second motor 133 and is adapted for starting or shutting the second motor 133.

A first starting unit is disposed on the panel assembly 2, which comprises a starting key 72 disposed on the panel assembly 2 and being moveable upwardly and downwardly, and a pulling rod 73 movably connected to the panel assembly 2. The starting key 72 moves to a bottom of the panel assembly 2, the bottom of the starting key 72 is pushed by the bottom of the pulling rod 73 to touch and start the starting switch 71, the second motor 133 begins working. And when the bottom of the starting key 72 is disconnected from the starting switch 71, the starting switch 71 is closed, the second motor 133 stops working.

The first starting unit is arranged to avoid the accident caused by starting or closing the second motor through operating the starting switch 71 by mistake, and the safety of the device can be further improved.

In the preferred embodiment, the device can be a lawn mower, in which the control panel is disposed. The second motor can be a motor driving the cutter of the lawn mower to rotate. When the device is a snow sweeper, in which the control panel is disposed, the second motor can be a motor driving the impeller of the snow sweeper to rotate.

In one embodiment of the present invention, the pulling rod 73 comprises a compression block 731 adapted for pushing the starting key 72 to touch the starting switch 71 as the pulling rod 73 rotating. A distance between the starting switch 71 and the compression block 731 is larger than a displacement distance of the compression block 731 caused by the rotation thereof.

In one embodiment of the present invention, the starting key 72 comprises a movable contacting block 721 which is pushed by the compression block 731 to contact with the starting switch 71. One end of the movable contacting block 721 is movably connected to the starting key 72, and the other end is in a suspended form. The movable contacting block 721 is pushed by the compression block 731 to contact the starting switch 71, thereby starting the starting switch 71.

In one embodiment of the present invention, the movable contact block 721 can be movably connected to the starting key 72 through an elastic connector 74. The elastic connector 74 can be a metal dome, or a spring.

During applying the present invention, the starting key 72 can pass through the upper panel of the panel assembly 2 and be disposed on the lower panel of the panel assembly 2. Both the pulling rod 73 and the starting switch 71 can be assembled onto the lower panel of the panel assembly 2.

During applying the present invention, the starting switch 71 can be opened or closed by inserting the starting key 72 into the panel assembly 2. No limitation is required here.

When the starting key 72 is pulled out from the panel assembly 2 or is not pressed, the starting switch 71 will not be touched if the pulling rod 73 is operated, since the compression block 731 of the pulling rod 73 cannot contact with the movable contacting block 721. When the starting key 72 is inserted into the panel assembly 2 or moves downwardly to the bottom of the lower panel 22 of the panel assembly 2, if the pulling rod 73 is operated and the compression block 731 of the pulling rod 73 will contact with the movable contacting block 721. Then, the movable contacting block 721 can touch the starting switch 71 to thereby staring the starting switch 71.

Referring to FIG. 1 and FIGS. 11-13, a motor rotation switch 81 is also arranged in the panel assembly 2 and adapted for opening or closing the second motor provided power for the device, similar with the starting switch 71.

Correspondingly, a second starting unit is disposed on the panel assembly 2 for triggering the motor rotating switch 81 and comprise a button unit 82, a connecting assembly 83, and an operating assembly 84.

The button unit 82 moves downwardly to press the connecting assembly 83 to connect with the operating assembly 84. The connecting assembly 83 is driven to press on and triggered the motor rotation switch 81 by moving the operating assembly 84.

The second starting unit is configured to avoid the accident caused by starting or closing the second motor through operating the motor rotation switch 81 by mistake, and the safety of the device can be further improved.

In one embodiment of the present invention, the operating assembly 84 comprises a pulling rod 73 movably connected to the panel assembly 2 and a pulling plate 841 driven by the pulling rod 73. The button unit 82 comprises a pressing head 821. The connecting assembly 83 comprises a sliding plate 831 movably connected with the panel assembly 2 and a hanging plate 832 movably connected with the sliding plate 831.

The pressing head 821 is arranged on upon the hanging plate 832, one end of the hanging plate 832 is located upon the pulling plate 841. The pressing head 821 is pressed downwardly to make the hanging plate 832 engage with the pulling plate 841. The pulling rod 73 is connected with the pulling plate 841, so that the hanging plate 832 can be driven by the pulling rod 73 via the pulling plate 841 and further make the sliding plate 831 move along the panel assembly 2 to trigger the motor rotation switch 81.

During applying the present invention, the pulling rod 73 can be connected to the pulling plate 841 in a variety of ways. In one embodiment of the invention, the end of the pulling rod 73 connected with the pulling plate 841 can be arranged with a gear 732, and the end of the pulling plate 841 connected with the pulling rod 73 can be arranged with a rack 841a engaged with the gear 732. The pulling plate 841 can be driven to move by turning the pulling rod 73 with the cooperation of the gear 732 and rack 841a.

The hanging plate 832 can latches with the pulling plate 841 in a variety of ways. In one embodiment of the invention, a latching groove 841b can be arranged on the pulling plate 841. One end of the hanging plate 832 is hinged on the sliding plate 831, and the other end of the hanging plate 832 is provided with a convex structure 832a clamped to the latching groove 841b. When the pressing head 821 is depressed, the latching groove 841b on the pulling plate 841 can be driven to engage with the convex structure 832a on the hanging plate 832, thereby making the hanging plate 832 clamped with the pulling plate 841.

In one embodiment of the present invention, in order to facilitate receiving the pressing operation, a pressing head button 821*a* can be arranged and connected at the upper end of the pressing head 821.

In one embodiment of the present invention, the button unit 82 can be further comprise a button reset spring 822 arranged between the pressing head 821 and the pressing head button 821*a* and adapted to reset the location of the pressing head button 821*a*.

In one embodiment of the present invention, the operating assembly 84 can be further comprise a pulling plate reset spring 842 arranged between the pulling plate 841 and the panel assembly 2 to reset the location of the pulling plate 841.

In one embodiment of the present invention, the connecting assembly 83 can be further comprise a hanging plate torsion spring 833 connected with the hanging plate 832, to reset the location of the hanging plate 832.

In the preferred embodiment, the button unit 82 can be arranged on the upper panel 21 of the panel assembly 2. The connecting assembly 83 and the motor rotation switch 81 can be arranged on the lower panel 22 of the panel assembly 2.

It is to be understood, in the preferred embodiment, the control panel can just integrate the locking assembly with the first switch unit, or just integrate the starting switch 71 with the first starting unit, or just integrate the motor rotation switch 81 with the second starting unit. Of course, the control panel can integrate any two of or all of the components in above embodiments. That is, no limitation is required.

Figure 14:
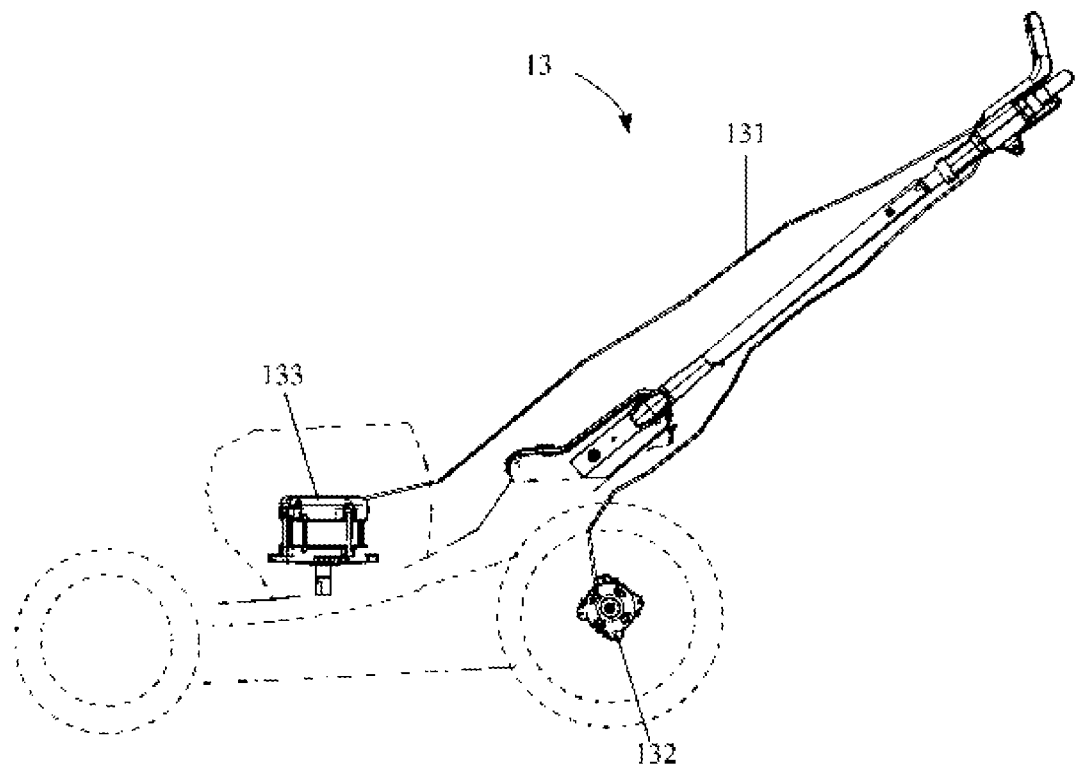
FIG. 14 is a perspective view of a power device in accordance with the embodiments of the present invention.

Referring to FIG. 14, as mentioned above, the power device 13 comprises the housing 131, the first motor 132 and the second motor 133 located in the housing 131, and the control panel. The first motor 132 is adapted to provide self-propelled power, and the second motor 133 is adapted to provide working power for the power device 13.

In one embodiment of the present invention, the power device 13 can be in a self-propelled driving mode by operating the self-propelled switch 134. As mentioned above, the self-propelled switch 134 can be triggered by the locking assembly, but the self-propelled switch 134 also can be triggered without the locking assembly, in such a manner, the locking assembly is also adapted to set the self-propelled speed of the power device 13 at different values when the power device 13 is in the self-propelled driving mode, so that the power device 13 can be switched in the variable speed self-propelled driving mode and the constant speed self-propelled driving mode to further improve the user experience.

During applying the present invention, the locking assembly are configured to set the self-propelling speed of the power device 13 at different values, and the locking assembly can be in several different structures. In one embodiment of the invention, the self-propelling speed of the power device 13 can be set at different values by fixing the panel assembly 2 at different positions onto the pushing rod 1.

During applying the present invention, a plurality of positioning holes can be arranged at different positions of the pushing rod 1, and the locking assembly can lock the panel assembly 2 at different positioning holes, in such a manner that set the self-propelling speed of the power device 13 at different values.

During applying the present invention, when the panel assembly 2 is locked at a certain position of the pushing rod 1, the power device 13 operates in a constant speed self-propelled driving mode. When the panel assembly 2 is not locked onto the pushing rod 1, the power device 13 operates in a variable speed self-propelled driving mode.

During applying the present invention, if the self-propelled switch 134 is triggered by the locking knob 41, the first motor 132 is in a standby state, the device is in the self-propelled driving mode, since locking knob 41 is also make the locking shaft 42 unlock the pushing rod 1, the control panel 2 can slide along the pushing rod 1, so the locking assembly will not be used to set the self-propelling speed of the power device 13 in this case. A rotating speed of the first motor 132 at first is zero and will be adjusted by sliding potentiometer 9 as described below.

During applying the present invention, the locking knob 41 and the self-propelled switch 134 of the power device 13 can also be non-linkage setting. Such as, a separate external switch can be arranged to start or close the self-propelled switch 134, or the self-propelled switch 134 can be directly operated. At this time, the rotating and closing of the locking knob 41 do not affect the on-off of the self-propelled switch 134, and the locking assembly can be used to set the self-propelling speed of the power device 13 in this case.

During applying the present invention, the self-propelled speed range of the power device 13 can be within [0, 3.5 km/s].

Figure 15:
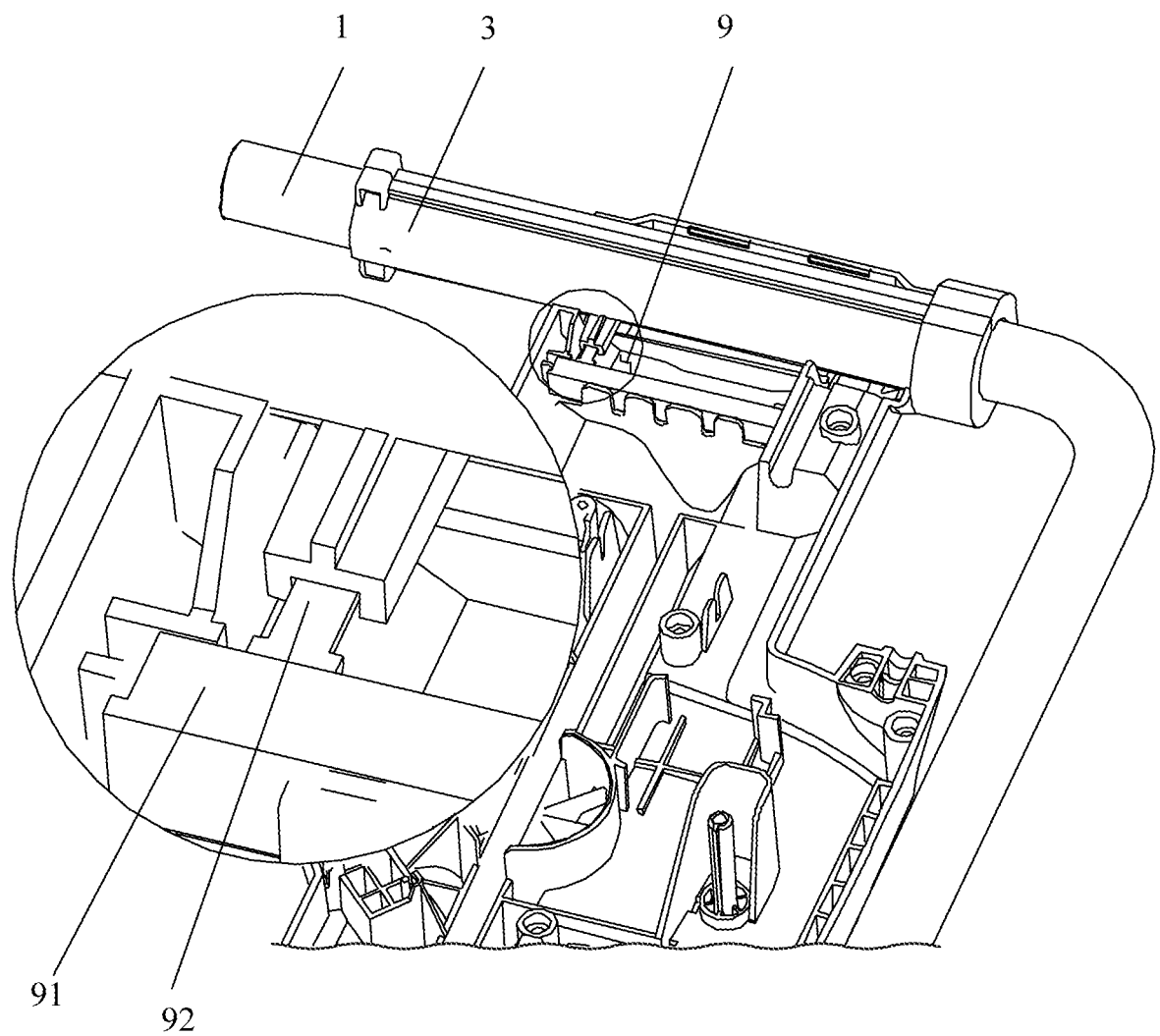
FIG. 15 is a perspective view of a sliding potentiometer in accordance with the embodiments of the present invention.

Referring to FIG. 15, in one embodiment of the present invention, the panel assembly 2 comprises the sliding potentiometer 9 connected to the first motor 132. The sliding potentiometer 9 comprises a potentiometer base 91 and a sliding needle 92 movably connected to the potentiometer base 91. According to the moving distance of the sliding needle 92 on the potentiometer base 91, the rotation speed of the first motor 132 is changed to adjust the self-propelling speed of the power device 13. The sliding potentiometer 9 can work under that the locking member is not used to adjust the self-propelling speed of the power device 13.

During applying the present invention, the relative displacement distance between the panel assembly 2 and the guideway 3 is represented by S1 as the preset first distance, and the relative displacement distance between the panel assembly 2 and the guideway 3 is represented by S2 as the maximum distance. When the relative displacement distance between the panel assembly 2 and the guideway 3 is within [0, s1], it is called the front adjusting distance, and when the relative displacement distance between the panel assembly 2 and the guideway 3 is within [s1, s2], it is called the rear adjusting distance.

In one embodiment of the present invention, the acceleration of the sliding needle 92 as moving within the front adjusting distance is less than the acceleration of the sliding needle 92 as moving within the rear adjusting distance, in such a manner that avoiding the power device 13 moving too fast to cause danger as moving within the front adjusting distance. The safety can be further improved.

In one embodiment of the present invention, the potentiometer base 91 can be fixed on the panel assembly 2, and one end of the sliding needle 92 can be fixed on the guideway 3.

In one embodiment of the present invention, the potentiometer base 91 can be fixed on the guideway 3, and one end of the sliding needle 92 is fixed on the panel assembly 2.

In one embodiment of the present invention, the panel assembly 2 also can comprise a reset apparatus arranged between the two guideways 3 on both sides of the pushing rod 1 and being adapted to reset the location of the panel assembly 2.

During applying the present invention, the reset apparatus comprises a reset rod 101 connected with the panel assembly 2 and the pushing rod 1, and a reset rod return spring 102 sleeved on the reset rod 101. One end of the reset rod return spring 102 is connected with the pushing rod 1.

The reset rod 101 is driven to rotate around the pushing rod 1 by the movement of the panel assembly 2, and the reset rod 101 is driven to rotate back by the reset rod return spring 102, in such a manner that the panel assembly 2 moves back to its original position.

In one embodiment of the present invention, the reset rod 101 comprises a main rod 101*a* connected with the panel assembly 2 and a pair of auxiliary rods 101*b* arranged at two ends of the main rod 101*a*. The auxiliary rods 101 are connected with the pushing rod 1.

During applying the present invention, the auxiliary rod 101*b* can be movably connected to the mounting hole in the pushing rod 1 and can rotate around the mounting hole. The main rod 101*a* can latch with the panel assembly 2. When the panel assembly 2 moving, the reset rod 101 actively rotates around the pushing rod 1, and the reset rod 101 is driven to rotate back by the reset rod return spring 102, in such a manner that driving the panel assembly 2 move back to its original position.

During applying the present invention, the main rod 101*a* and the auxiliary rod 101*b* can be integrated into one. The main rod 101*a* can be cylindrical, and the cross section of the auxiliary rod 101*b* can be L-shaped.

During applying the present invention, both ends of the upper panel 21 and the lower panel 22 of the panel assembly 2 can be movably connected to the guideway 3.

During applying the present invention, a chuck 103 can be arranged on the lower panel 22 of the panel assembly 2, and the reset rod 101 can be partially fitted and installed in the chuck 103.

During applying the present invention, a chuck 103 can be arranged on the upper panel 21 of the panel assembly 2, and the reset rod 101 can be partially fitted and installed in the chuck 103.

In one embodiment of the present invention, the power device 13 can be garden tools.

Figure 16:
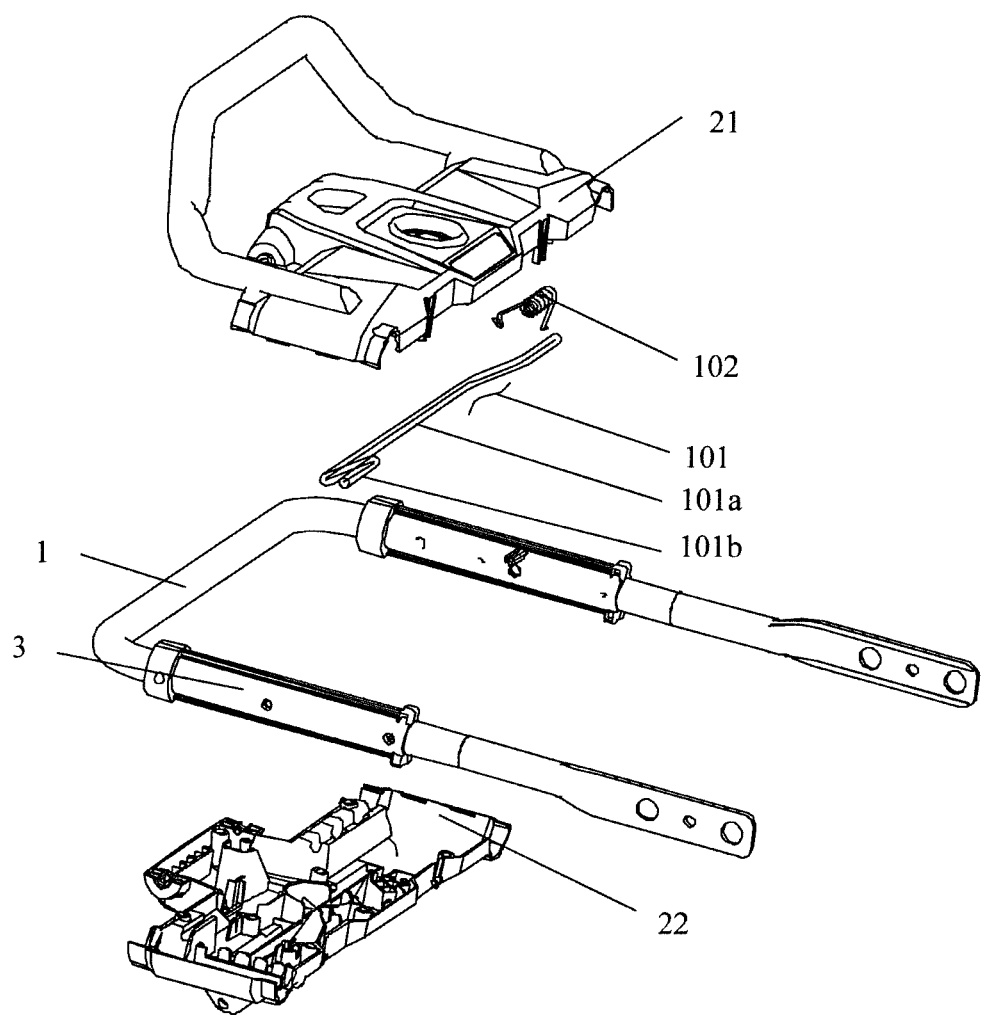
FIG. 16 is an exploded view of a reset apparatus in the present embodiment.
Figure 17:
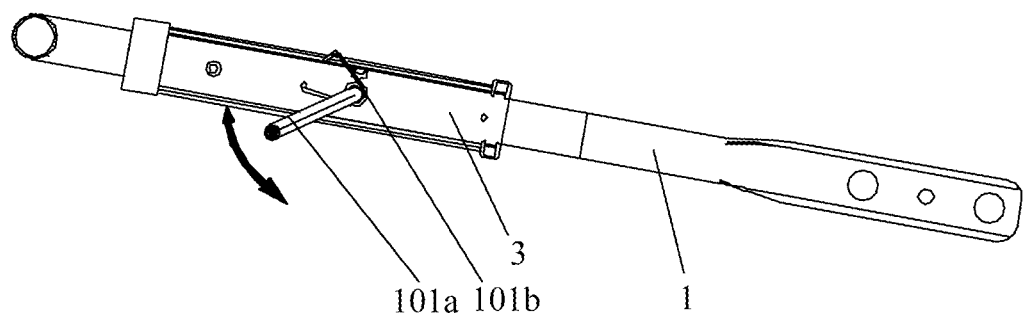
FIG. 17 is a perspective view of the reset apparatus in moving state as shown in FIG. 16.
Figure 18:
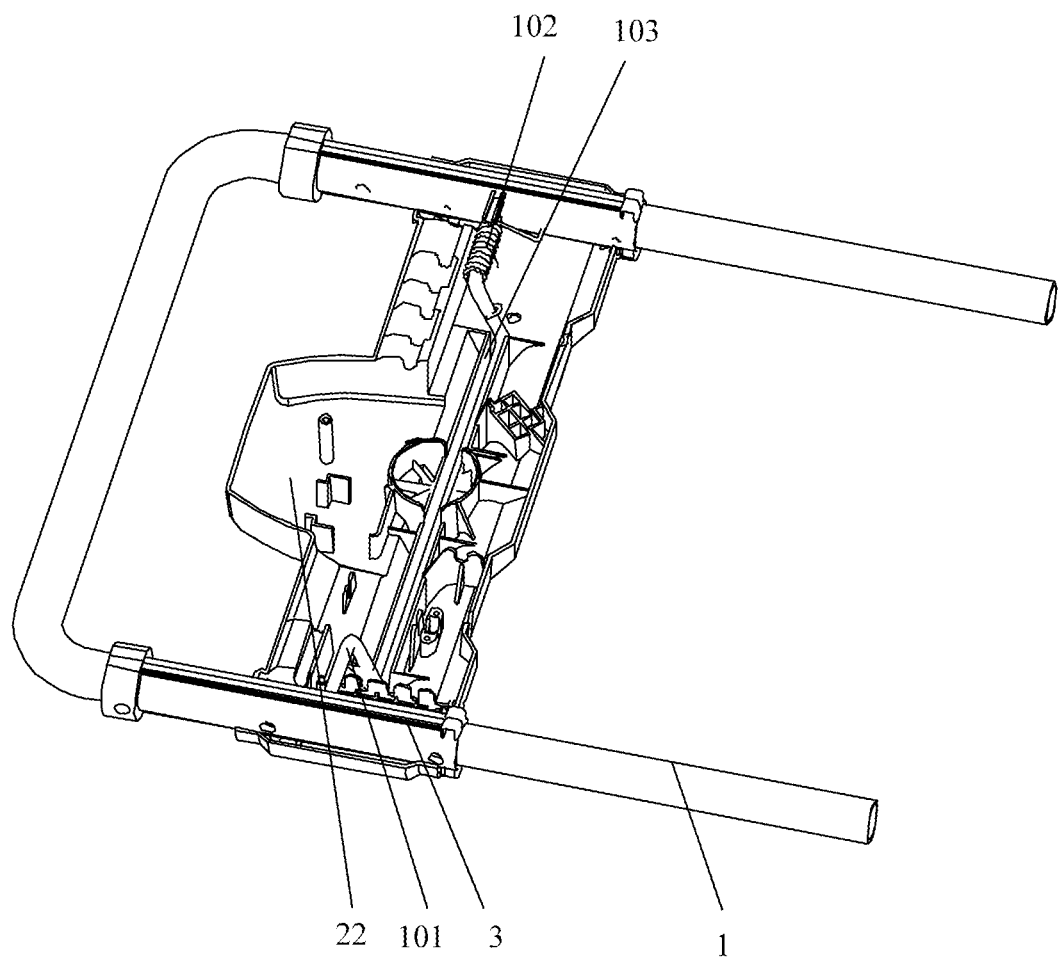
FIG. 18 is a perspective view of a lower panel of the panel assembly in accordance with the preferred embodiments of the present invention.
Figure 19:
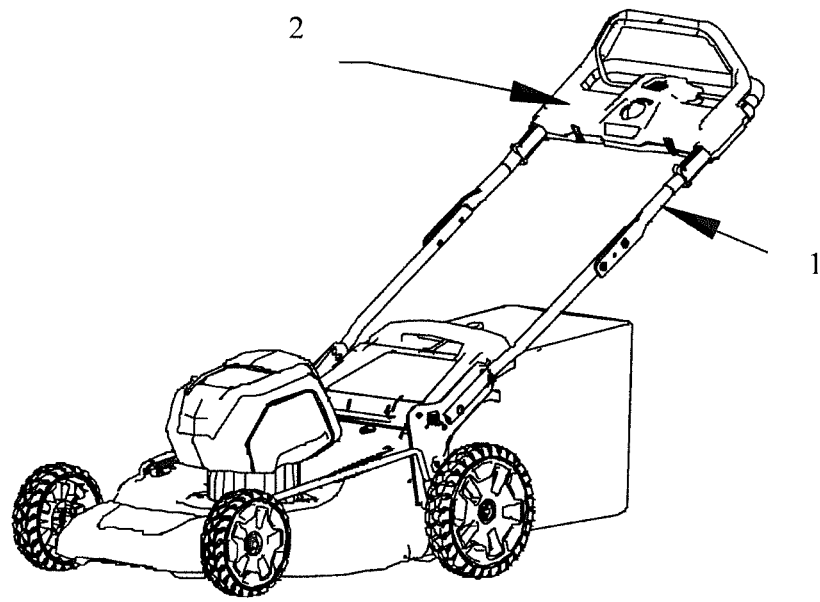
FIG. 19 is a perspective view of a lawn mower in accordance with the preferred embodiments of the present invention.

During applying the present invention, the garden tool can be a lawn mower as shown in FIG. 16, or a snow sweeper, a soil loosener, a lawn harrower or any other kinds of wheeled driving device.

Taking the power device 13 as a lawn mower as an example, the working principle of the lawn mower is described in detail as follows:

During applying the present invention, the lawn mower usually comprises the first motor 132 for providing self-propelled power and the second motor 133 for providing the working power for the equipment. The first motor 132 and the second motor 133 are usually driven independently.

Figure 20:
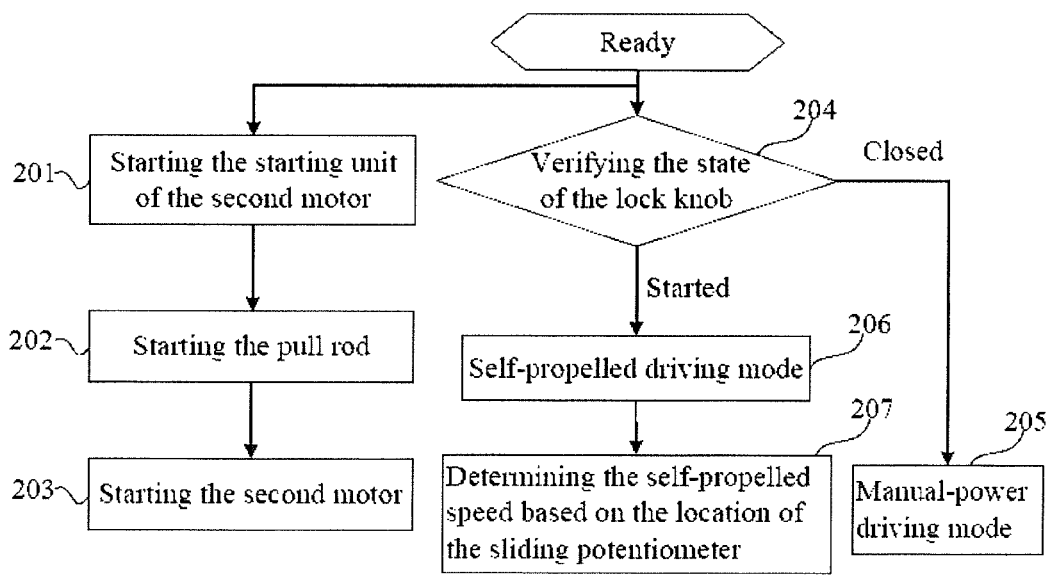
FIG. 20 is a perspective view of one controlling method for the lawn mower in accordance with the preferred embodiments of the present invention.
Figure 21:
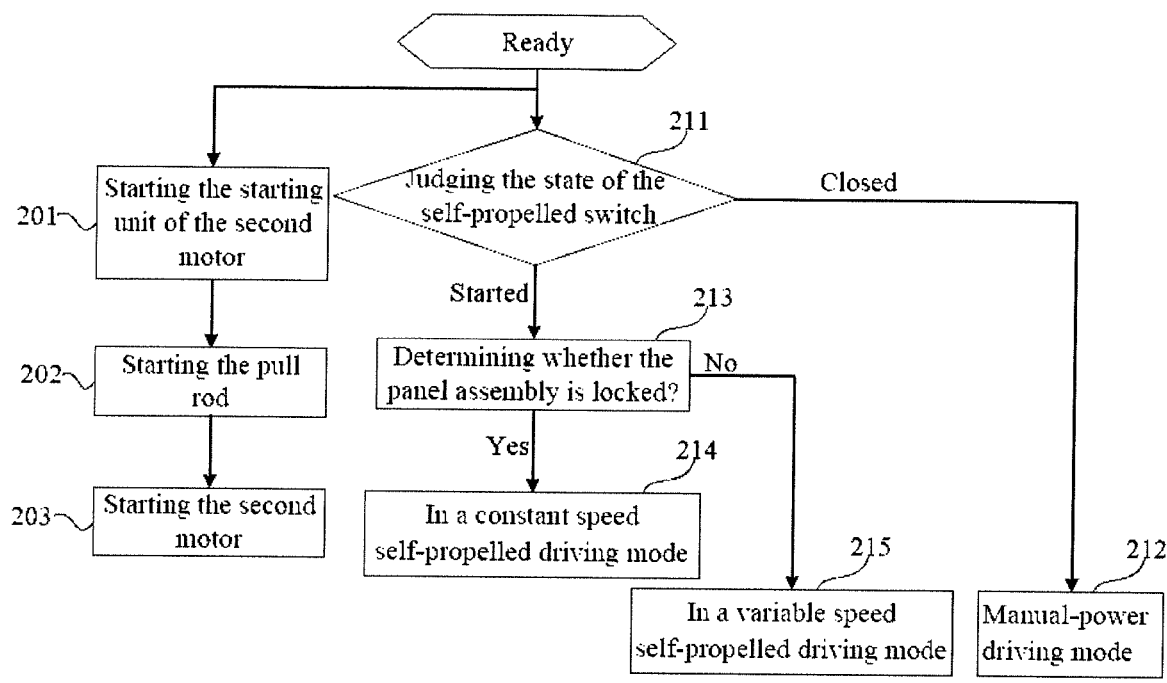
FIG. 21 is a perspective view of another controlling method for the lawn mower in accordance with the preferred embodiments of the present invention.

Referring to FIG. 20 and FIG. 21, in one embodiment of the present invention, firstly, the driving process of the second motor 133 is described as follows:

Step 201, start the starting unit of the second motor 133.

During applying the present invention, the starting unit of the second motor 133 can be the first starting unit in the above-mentioned embodiment, or it can be the second starting unit in the above-mentioned embodiment. That is, no limitation is required.

Taking the starting unit of the second motor 133 as the second starting unit as an example, the button assembly is pressed to make the hanging plate 832 latch with the pulling plate 841, starting the starting unit of the second motor 133.

Step 202, start the pulling rod 1.

During applying the present invention, the motor rotation switch 81 can be triggered by starting the pulling rod 1, since the sliding plate 831 which directly actives the motor rotation switch 81 is driven to move on the panel assembly 2 by the hanging plate 832 driven by the pulling plate 841.

Step 203, start the second motor 133.

During applying the present invention, the second motor 133 can be triggered to start working by operating the motor rotation switch 81. As the second motor 133 is started, the lawn mower can perform mowing work.

It is to be understood, during applying the present invention, according to the driving state of the first motor 132, the driving mode of the lawn mower can be determined. In other words, the lawn mower that the second motor 133 is always started, either work in manual-power driving mode, or work in constant speed self-propelled driving mode or in variable speed self-propelled driving mode.

Referring to FIG. 20, in one embodiment of the present invention, the driving process of the first motor 132 is described as follows, wherein the locking assembly is used to touch the self-propelled switch 134 in this process:

Step 204, verify the state of the locking knob 41.

If the locking knob 41 is not turned on, execute step 205, otherwise step 206 is executed.

Step 205, the lawn mower works under the manual-power driving mode.

When the locking knob 41 is not turned on, the self-propelled switch 134 is not turned on. The self-propelled key knob 54 points to the right 45° in front of the panel assembly 2, and the locking shafts 42 on the left and right are inserted into the holes of the pushing rod 1. At this moment, the whole panel assembly 2 cannot slide along the pushing rod 1. The first motor 132 is in the closed state. And the lawn mower works in the manual-power driving mode.

Step 206, the lawn mower works under the self-propelled driving mode.

During applying the present invention, the self-propelled key 51 can be driven to separate from the positioning holes 53 by the operator pressing down the self-propelled key knob 54. The clip on the bottom of the self-propelled key 51 can be driven to engage in the catching slot 52 of the locking knob 41 by rotating the self-propelled key knob 54. At this moment, the self-propelled key 51 is driven to rotate by continually rotating of the self-propelled key knob 54, in such a manner that the self-propelled key knob 54 is rotating, the locking shafts 42 connected with the self-propelled key knob 54 are driven to compress and separate from the pushing rod 1 by rotating the self-propelled key knob 54. At this moment, the panel assembly 2 is unlocked and can freely slide on the pushing rod 1.

When releasing the self-propelled key knob 54, the self-propelled key 51 is ejected from the locking knob 41 under the action of the key reset spring 55. The self-propelled key 51 is inserted into the corresponding positioning holes 53 of the panel assembly 2 through the positioning columns; the self-propelled switch 134 is touched by the locking knob 41 and the first motor 132 begins to work, and the device enters in the self-propelled driving mode.

Step 207, determine the self-propelled speed based on the location of the sliding potentiometer 9.

During applying the present invention, the panel assembly 2 is driven to slide forward along the guideway 3 on the pushing rod 1 through the operator pushing the panel assembly 2, in such a manner that, the reset rod 101 being driven to rotate forward by the sliding of the panel assembly 2. When the external force stops pushing the panel assembly 2, the reset rod 101 will rotate backward under the action of torsional spring force. At this moment, the panel assembly 2 can be driven to slide backward along the guideway to the original position driving by the reset rod 101.

When the panel assembly 2 moves on the guideway 3, the sliding needle 92 of the sliding potentiometer 9 is driven to slide on the potentiometer base 91 by the movement of the panel assembly 2, and producing relative displacement. According to the moving distance of the sliding needle 92 on the potentiometer base 91, the first motor 132 determines the self-propelled speed of the lawn mower. The larger the moving distance of the panel assembly 2 on the guideway 3, the larger the stroke of the sliding potentiometer 9, and the faster the self-propelled speed of the lawn mower.

When the first motor 132 needs to be shut down, the panel assembly 2 is reset. Then the left locking shaft 42 on the locking knob 41 is inserted into the pushing rod 1 by turning off the self-propelled switch 134. Then the self-propelled key 51 returns to its original position by releasing the self-propelled key knob 54. The first motor 132 is closed.

Referring to FIG. 21, in another embodiment of the present invention, another driving process of the first motor 132 is described as follows, wherein the locking assembly is not used to touch the self-propelled switch 134 but to adjust the speed in this process:

Step 211, judge the self-propelled switch 134 state.

When the self-propelled switch 134 is off, step 212 is executed. Otherwise, step 213 is executed.

Step 212, the lawn mower works under the manual-power driving mode.

Step 213, determine whether the panel assembly 2 is locked.

When the panel assembly 2 is locked, step 214 is executed. Otherwise, step 215 is executed.

Step 214, the lawn mower is in a constant speed self-propelled driving mode.

At this moment, according to the different positions of the panel assembly 2 fixed on the pushing rod 1 by the locking member, the self-propelled speed can be determined. And in such a manner that the device working in constant speed self-propelled driving mode.

Step 215, the lawn mower is in a variable speed self-propelled driving mode.

When the panel assembly 2 is unlocked to the pushing rod 1, the lawn mower is in a variable speed self-propelled driving mode.

When the first motor 132 needs to be shut down, the self-propelled switch 134 can be used to unlock the panel assembly 2 and put the panel assembly back to its original position. At this moment, the pulling rod 1 is loosened, and the starting unit of the second motor 133 is closed. And the lawn mower stops working.

Compare with the existing technology, the control panel and the power device of the invention can be switched among various driving modes, and it is convenient for the operator to operate. The control panel can also be used on other kinds of wheeled driving device, such as snow sweepers and soil looseners. The principle of the power devices is also within the scope of the protection of this patent, and the detail will not be described here.

Although the present invention discloses some embodiments and generally associated methods, it is apparent for those skilled in the art to change and substitute of these embodiments and methods. Therefore, the above description of the example embodiment does not restrict the disclosure. It is also possible to make other changes, substitutions and changes without departing from the spirit and scope of the disclosure as defined by the appended claims.

Although the invention is disclosed above, the invention is not limited to this. Any person skilled in the art may make various changes and modifications without departing from the spirit and scope of the present invention, so the scope of right of the present invention shall be subject to the scope defined by the claims.

I claim:

1. A control panel, comprising a pushing rod connected to a machine body;
   a panel assembly reciprocatingly sliding on said pushing rod;
   a locking assembly connected to said panel assembly, said locking assembly being adapted to lock said panel assembly on said pushing rod and unlock said panel assembly from said pushing rod;
   a sensor configured to detect relative positions between said pushing rod and said panel assembly and to adjust a rotating speed of a motor driving said machine body; and
   a self-propelled switch, wherein said self-propelled switch is configured to be triggered causing said machine body to be switched from a manual-power driving mode to a self-propelled driving mode;
   wherein said locking assembly comprises a locking knob connected to said panel assembly, and at least one locking shaft connected to said locking knob and movable relative to said panel assembly to be latched with said pushing rod, wherein said locking rod is locked and unlocked with said pushing rod by entering and exiting said pushing rod, and said panel assembly slides along said pushing rod when said locking rod is unlocked;
   wherein said panel assembly comprises a first switch unit connected with said locking knob, wherein said first switch unit is adapted to control said locking shaft to lock or unlock said panel assembly through said locking knob;
   wherein said first switch unit comprises a self-propelled key connected with said locking knob, said locking knob is driven to rotate by rotating said self-propelled key about an axis of rotation extending transverse to said panel assembly; and
   wherein said first switch unit further comprises a self-propelled key knob assembled on said self-propelled key, wherein said self-propelled key is driven to move upwardly and downwardly transverse to said panel assembly by said self-propelled key knob in a direction parallel to said axis of rotation of said self-propelled key.

2. The control panel as claimed in claim 1, wherein said first switch unit further comprises a positioning assembly connected with said self-propelled key, wherein said positioning assembly is adapted to fix said self-propelled key.

3. The control panel as claimed in claim 1, wherein when said locking knob rotates to bring said locking shaft to unlock said panel assembly, said locking knob simultaneously touches and triggers said self-propelled switch.

4. The control panel as claimed in claim 1, further comprising a starting switch arranged on said panel assembly, said panel assembly comprises a starting unit disposed on said panel assembly, said starting unit comprises a starting key disposed on said panel assembly and being moveable upwardly and downwardly; wherein when said starting key moves to a bottom of said panel assembly, a bottom of said starting key will touch and start said starting switch under a push of a bottom of a pulling rod, and said starting switch will be closed when said bottom of said starting key disconnects from said starting switch.

5. The control panel as claimed in claim 4, wherein said pulling rod comprises a compression block adapted to push said starting key to touch said starting switch as said pulling rod rotates, wherein a distance between said starting switch and said compression block is larger than a translation distance of said compression block caused by the rotation thereof.

6. The control panel as claimed in claim 1, wherein said control panel comprises a starting switch and a starting unit, said starting unit comprising a button unit, a connecting assembly, and an operating assembly;

wherein said button unit moves downwardly to press said connecting assembly connecting with said operating assembly and said connecting assembly is driven to move and press said starting switch by moving said operating assembly, in such a manner that said starting switch is triggered.

7. The control panel as claimed in claim 6, wherein said operating assembly comprises:

a pulling rod movably connected to said panel assembly and a pulling plate driven by said pulling rod;

said button unit comprises a pressing head configured to receive a pressing operation;

said connecting assembly comprises a sliding plate moveably connected with said panel assembly and a hanging plate movably connected with said sliding plate, wherein said pressing head is arranged on said upper part of said hanging plate, one end of said hanging plate is located on said upper part of said pulling plate, said pressing head is pressed down to engage said hanging plate and said pulling plate, and said hanging plate is driven to move by moving said pulling plate driven by said pulling rod; and said sliding plate is driven to move along said panel assembly to trigger said starting switch through said hanging plate.

8. The control panel as claimed in claim 7, wherein said pressing head includes an upper end, and further comprising a pressing head button arranged and connected at said upper end of said pressing head, and said pressing head is driven to move downward by pressing said pressing head button.

* * * * *